United States Patent
Yu et al.

(10) Patent No.: US 12,182,914 B2
(45) Date of Patent: Dec. 31, 2024

(54) IMAGE DISPLAY FORMAT CONVERSION METHOD

(71) Applicant: HYWEB TECHNOLOGY CO., LTD., Hsinchu (TW)

(72) Inventors: Chung-Wei Yu, Hsinchu (TW); Yu-Yu Lin, Hsinchu (TW)

(73) Assignee: HYWEB TECHNOLOGY CO., LTD., Hsinchu (TW)

( * ) Notice: Subject to any disclaimer, the term of this patent is extended or adjusted under 35 U.S.C. 154(b) by 183 days.

(21) Appl. No.: 18/116,147

(22) Filed: Mar. 1, 2023

(65) Prior Publication Data

US 2024/0169625 A1 May 23, 2024

(30) Foreign Application Priority Data

Nov. 21, 2022 (TW) ................................. 111144446

(51) Int. Cl.
  G06T 11/60 (2006.01)
  G06T 3/40 (2006.01)
  G06T 7/70 (2017.01)
  G06T 13/00 (2011.01)
  G06V 10/82 (2022.01)

(52) U.S. Cl.
  CPC .............. *G06T 11/60* (2013.01); *G06T 3/40* (2013.01); *G06T 7/70* (2017.01); *G06T 13/00* (2013.01); *G06V 10/82* (2022.01); *G06T 2210/32* (2013.01)

(58) Field of Classification Search
  CPC ... G06T 11/60; G06T 7/70; G06T 3/40; G06T 13/00; G06T 2210/32; G06V 10/82
  See application file for complete search history.

(56) References Cited

U.S. PATENT DOCUMENTS

| | | | |
|---|---|---|---|
| 11,710,420 B1* | 7/2023 | Watson | G16H 50/20 434/236 |
| 2012/0299958 A1* | 11/2012 | Tsurumi | H04N 23/698 345/629 |
| 2014/0019865 A1* | 1/2014 | Shah | G06F 3/0484 715/731 |
| 2017/0024095 A1* | 1/2017 | Glasgow | G06F 3/0484 |
| 2021/0289186 A1* | 9/2021 | Peng | H04N 21/4318 |
| 2022/0075845 A1* | 3/2022 | Bowen | G06F 30/30 |

OTHER PUBLICATIONS

Tanaka, Takamasa, "Layout Analysis of Tree-Structured Scene Frames in Comic Images", "International Joint Conference on Artificial Intelligence", Jan. 2007, Semantic Scholar, pp. 2885-2890 (Year: 2007).*

Wang, Zezhong, "Interactive Data Comics", Jan. 2022, IEEE Transactions on Visualization and Computer Graphics, vol. 28, pp. 944-954 (Year: 2022).*

* cited by examiner

*Primary Examiner* — Terrell M Robinson

(74) *Attorney, Agent, or Firm* — Millen, White, Zelano & Branigan P.C.; Wan-Ching Montfort

(57) ABSTRACT

Disclosed is an image display format conversion method, comprising: a frame recognition step of performing a frame recognition process on a comic page image to obtain a plurality of comic frame images and frame position information; a frame sequence determination step of determining a frame viewing sequence according to a selected regional layout rule; and a frame reassembly step of reassembling and converting, based on the frame viewing sequence, the plurality of comic frame images into a digital media in an animation-like format or a scrolling-comic format.

9 Claims, 6 Drawing Sheets

IMAGE DISPLAY FORMAT CONVERSION METHOD

FIELD OF THE INVENTION

The present invention relates to a digital comic display technology, and more particularly relates to an image display format conversion method.

BACKGROUND OF THE INVENTION

Digital comics generally refer to comics that are stored as digital data and also include comics that are directly drawn in digital form, wherein displaying such digital comics usually requires a computer. With the popularity of mobile devices, the way people use computers to read the digital comics is gradually shifting from desktop computers to smart phones.

A comic usually contains a plurality of comic frames which are shown on a single comic page to illustrate a story with sequential pictures, serving as a storyboard. Whether it is the desktop computer or the smart phone, the display method thereof is similar in that the entire single comic page is displayed on the screen as it is. However, since the screen size of the smart phone is usually much smaller than the size of the single comic page, a reader needs to frequently operate the smart phone screen with gestures to zoom in on the comic page and slide between the comic frames to see clearly, thus making the experience of reading the digital comics much less enjoyable.

SUMMARY OF THE INVENTION

Accordingly, one objective of the present invention is to provide an image display format conversion method for converting digital comic images into a reader-friendly display format to solve the technical problems in prior art.

In order to overcome the technical problems in prior art, the present invention provides an image display format conversion method, comprising in sequence: a frame recognition step of utilizing a trained deep-learning artificial intelligence frame recognition unit to perform a frame recognition process on a comic page image, which is formed by a plurality of comic frames, to obtain a plurality of comic frame images within the comic page image and frame position information corresponding to the respective comic frame images; a frame sequence determination step of utilizing an image analysis unit to determine a frame viewing sequence of the plurality of comic frame images according to a selected regional layout rule based on the frame position information of the plurality of comic frame images within the comic page image, wherein the selected regional layout rule is one selected from a plurality of regional layout rules relating to different geographical regions; and a frame reassembly step of utilizing an image processing unit to reassemble and convert, based on the frame viewing sequence, the plurality of comic frame images into a digital media in an animation-like format or a scrolling-comic format, wherein the digital media in the animation-like format is formed by arranging the plurality of comic frame images in an animation according to an animation frame display sequence corresponding to the frame viewing sequence, the digital media in the scrolling-comic format is formed by arranging the plurality of comic frame images in a display page in the frame viewing sequence along a predetermined page scrolling direction.

In one embodiment of the present invention, the image display format conversion method is provided further comprising, before the frame recognition step, an image capture step of obtaining the comic page image by scanning a paper comic with a scanning unit.

In one embodiment of the present invention, the image display format conversion method is provided, wherein in the frame recognition step, the trained deep-learning artificial intelligence frame recognition unit performs the frame recognition process by using a YOLO-based neural network object detection model.

In one embodiment of the present invention, the image display format conversion method is provided, wherein in the frame recognition step, each of the comic frame images is a standard frame image, a broken frame image, or an out-of-frame frame image, wherein the standard frame image is the comic frame image having a complete and unbroken frame border, the broken frame image is the comic frame image having the frame border broken on at least one side thereof, and the out-of-frame frame image is the comic frame image having at least a graphical part thereof outside of the frame border.

In one embodiment of the present invention, the image display format conversion method is provided, wherein in the frame recognition step, the frame position information is coordinate information about four corners of the comic frame image.

In one embodiment of the present invention, the image display format conversion method is provided, wherein in the frame sequence determination step, the plurality of regional layout rules includes a European-American comic layout rule relating to European and American regions and a Japanese comic layout rule relating to Japanese region.

In one embodiment of the present invention, the image display format conversion method is provided further comprising, before the frame reassembly step, a frame resizing step of utilizing the image processing unit to resize each of the comic frame images to a size within a predetermined display size range.

In one embodiment of the present invention, the image display format conversion method is provided, wherein in the frame resizing step, the plurality of comic frame images is resized to have equal width and/or equal height.

In one embodiment of the present invention, the image display format conversion method is provided, wherein in the frame reassembly step, the predetermined page scrolling direction is a vertical direction or a horizontal direction.

With the technical means adopted by the present invention, the image display format conversion method of the present invention can converse a digital comic into the digital media in the animation-like format or the scrolling-comic format so that a reader no longer needs to frequently operate the smart phone screen with gestures when reading the digital comic, and thus the enjoyment of reading the digital comics will not be reduced. Moreover, by converting the digital comic into the digital media in the scrolling-comic format, the reader can simply scroll the screen in one direction to read the comic frames in order without repeatedly loading display pages, and by converting the digital comic into the digital media in the animation-like format, the readers can further save most of the effort of operating their smart phones, thus increasing the smoothness of reading and enhancing the reading experience.

DETAILED DESCRIPTION OF THE PREFERRED EMBODIMENTS

The preferred embodiments of the present invention are described in detail below with reference to FIG. 1 to FIG. 6. The description is used for explaining the embodiments of the present invention only, but not for limiting the scope of the claims.

Figure 1:
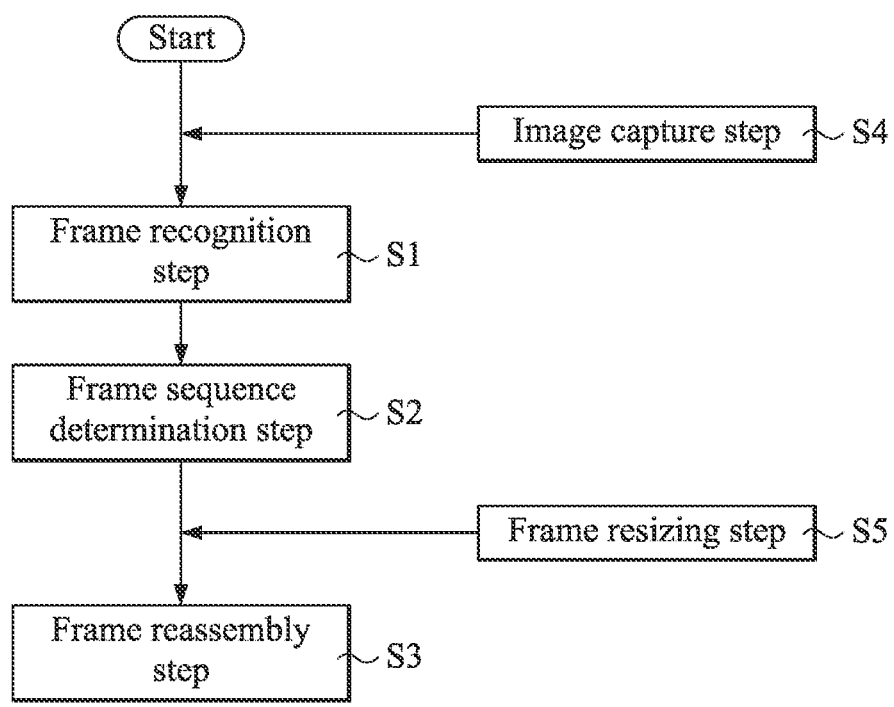
FIG. 1 is a schematic flowchart of an image display format conversion method according to one embodiment of the present invention.

As shown in FIG. 1, an image display format conversion method according to one embodiment of the present invention comprises: a frame recognition step S1, a frame sequence determination step S2 and a frame reassembly step S3.

Figure 2:
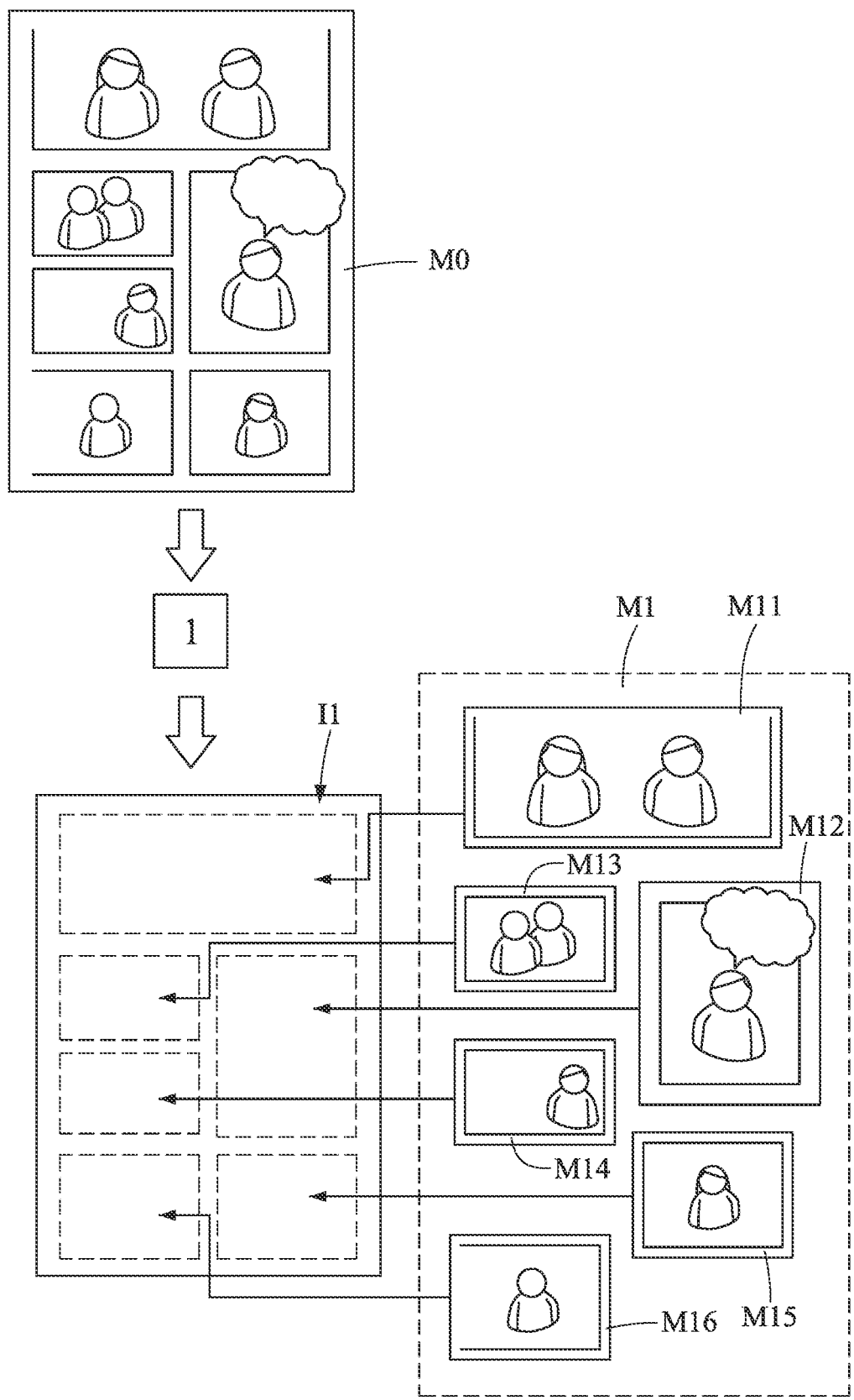
FIG. 2 is a schematic diagram illustrating a frame recognition step of the image display format conversion method according to the embodiment of the present invention.

As shown in FIG. 2, in the frame recognition step S1, a trained deep-learning artificial intelligence frame recognition unit 1 is utilized to perform a frame recognition process on a comic page image M0, which is formed by a plurality of comic frames, to obtain a plurality of comic frame images M1 within the comic page image M0 and frame position information I1 corresponding to the respective comic frame images M1.

Specifically, in the embodiment, in the frame recognition step S1, the trained deep-learning artificial intelligence frame recognition unit 1 performs the frame recognition process by using a YOLO (you only look once)-based neural network object detection model. In other words, the position of the comic frame images M1 (i.e., the frame position information I1) and the comic frame images M1 themselves are obtained from the comic page image M0 in an object detection manner as shown in FIG. 2. However, the present invention is not limited to this, and other neural network object detection models can be used by the trained deep-learning artificial intelligence frame recognition unit 1 as long as the frame recognition process can be performed effectively.

Furthermore, as shown in FIG. 2, in the frame recognition step S1, each of the comic frame images M1 is a standard frame image, a broken frame image, or an out-of-frame frame image, wherein the standard frame image is the comic frame image having a complete and unbroken frame border (e.g., comic frame images M13, M14 and M15), the broken frame image is the comic frame image having the frame border broken on at least one side thereof (e.g., comic frame images M11 and M16), and the out-of-frame frame image is the comic frame image having at least a graphical part thereof outside of the frame border (e.g., comic frame images M12). Since not all of the comic frame images are necessarily the standard frame images, but are often exceptions such as the broken frame images and the out-of-frame frame images, a conventional image processing technique is often difficult to cope with such situations. Compared with the conventional image processing technique, the present invention uses the deep-learning artificial intelligence (an artificial neural network based algorithm) to perform the frame recognition process so that the comic frame image M1, whether it is the standard frame image, the broken frame image or the out-of-frame frame image, can be obtained reliably.

Moreover, as shown in FIG. 2, in the frame recognition step S1, the frame position information I1 is coordinate information about four corners of the comic frame image M1. Specifically, the coordinate information in this embodiment refers to relative coordinate information of the four corners of the comic frame image M1 with respect to the comic page image M0. The relative position of any two comic frame images M1 in the comic page image M0 can be easily determined by comparing the relative coordinate information.

Figure 3:
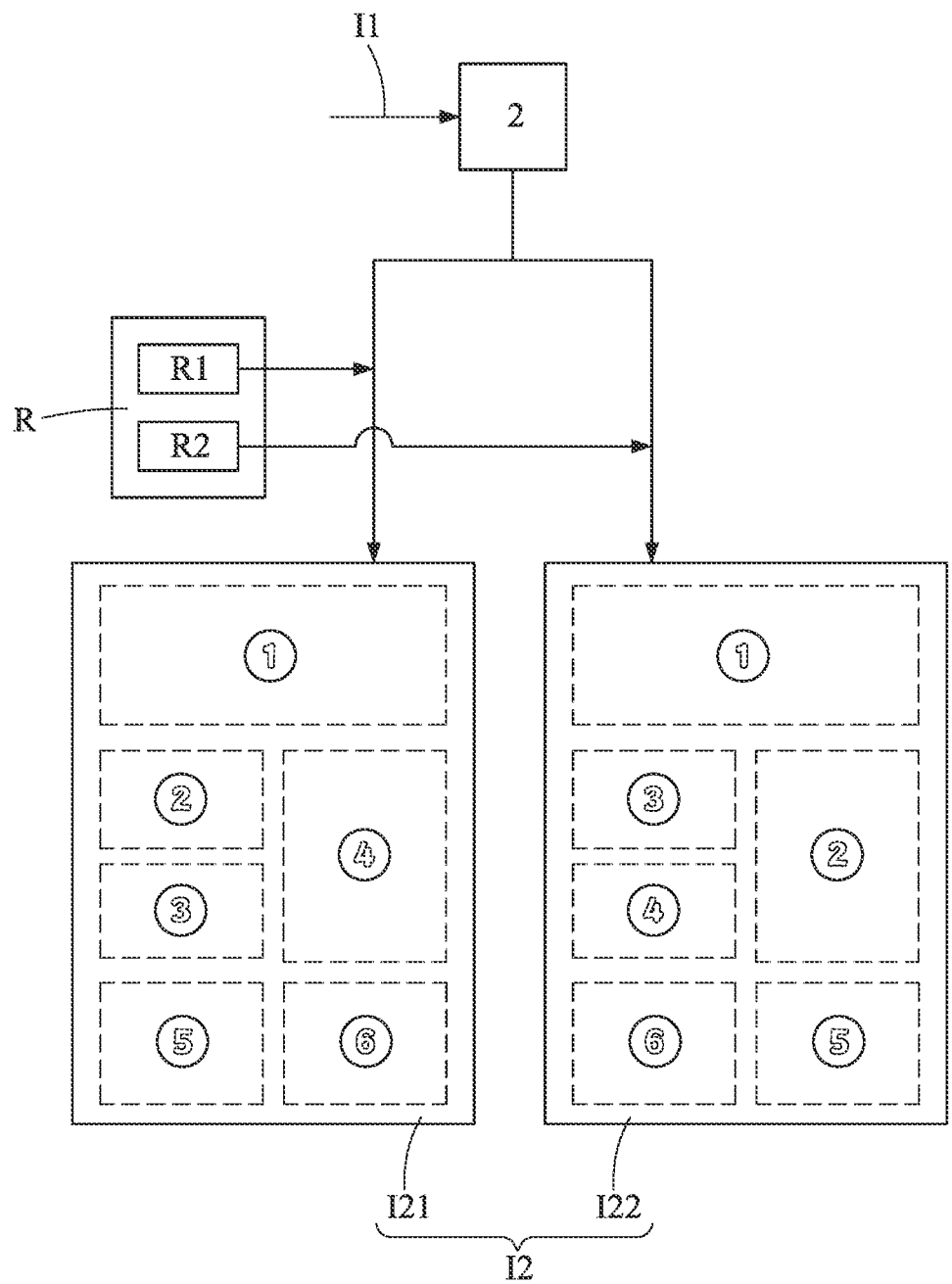
FIG. 3 is a schematic diagram illustrating a frame sequence determination step of the image display format conversion method according to the embodiment of the present invention.

As shown in FIG. 3, in the frame sequence determination step S2, an image analysis unit 2 is utilized to determine a frame viewing sequence I2 of the plurality of comic frame images M1 according to a selected regional layout rule R based on the frame position information I1 of the plurality of comic frame images M1 within the comic page image M0, wherein the selected regional layout rule R is one selected from a plurality of regional layout rules relating to different geographical regions.

Specifically, in the frame sequence determination step S2, the image analysis unit 2 determines the frame viewing sequence I2 of the comic frame images M1 obtained from the frame recognition step S1 according to chronological viewing order. Since the comic frames are used to illustrate a story in the same way as a storyboard, the frame viewing sequence I2 is the same as the storytelling sequence of the storyboard. In a general comic layout rule, the closer the position of the comic frame to the top side of the comic page, the higher the viewing order is, and the opposite is the lower. According to this principle, the image analysis unit 2 compares the relative position of the comic frame images M1 based on the frame position information I1, and accordingly determines the frame viewing sequence I2 of the comic frame images M1.

On the other hand, in the case that more than one comic frame image M1 is arranged at the same height, the image analysis unit 2 performs further determination according to the selected regional layout rule R. The comic layout rule may vary depending on the geographical region. For example, in this embodiment, the plurality of regional layout rules includes a European-American comic layout rule R1 relating to European and American regions and a Japanese comic layout rule R2 relating to Japanese region. The main difference between the European-American comic layout rule R1 and the Japanese comic layout rule R2 is that the comic frames are ordered from left to right in the European-American comic layout rule R1, while the comic frames are ordered from right to left in the Japanese comic layout rule R2. Therefore, as shown in FIG. 3, in the case that the European-American comic layout rule R1 is selected as the selected regional layout rule R, and more than one comic frame image M1 is arranged at the same height, the image analysis unit 2 determines that the comic frame image M1 located closer to the left side of the comic page image M0 has a higher viewing order, and thus generates a result such as frame viewing sequence I21. In the case that the Japanese comic layout rule R2 is selected as the selected regional layout rule R, the image analysis unit 2 determines that the comic frame image M1 located closer to the right side of the comic page image M0 has a higher viewing order, and thus generates a result such as frame viewing sequence I22.

Figure 4:
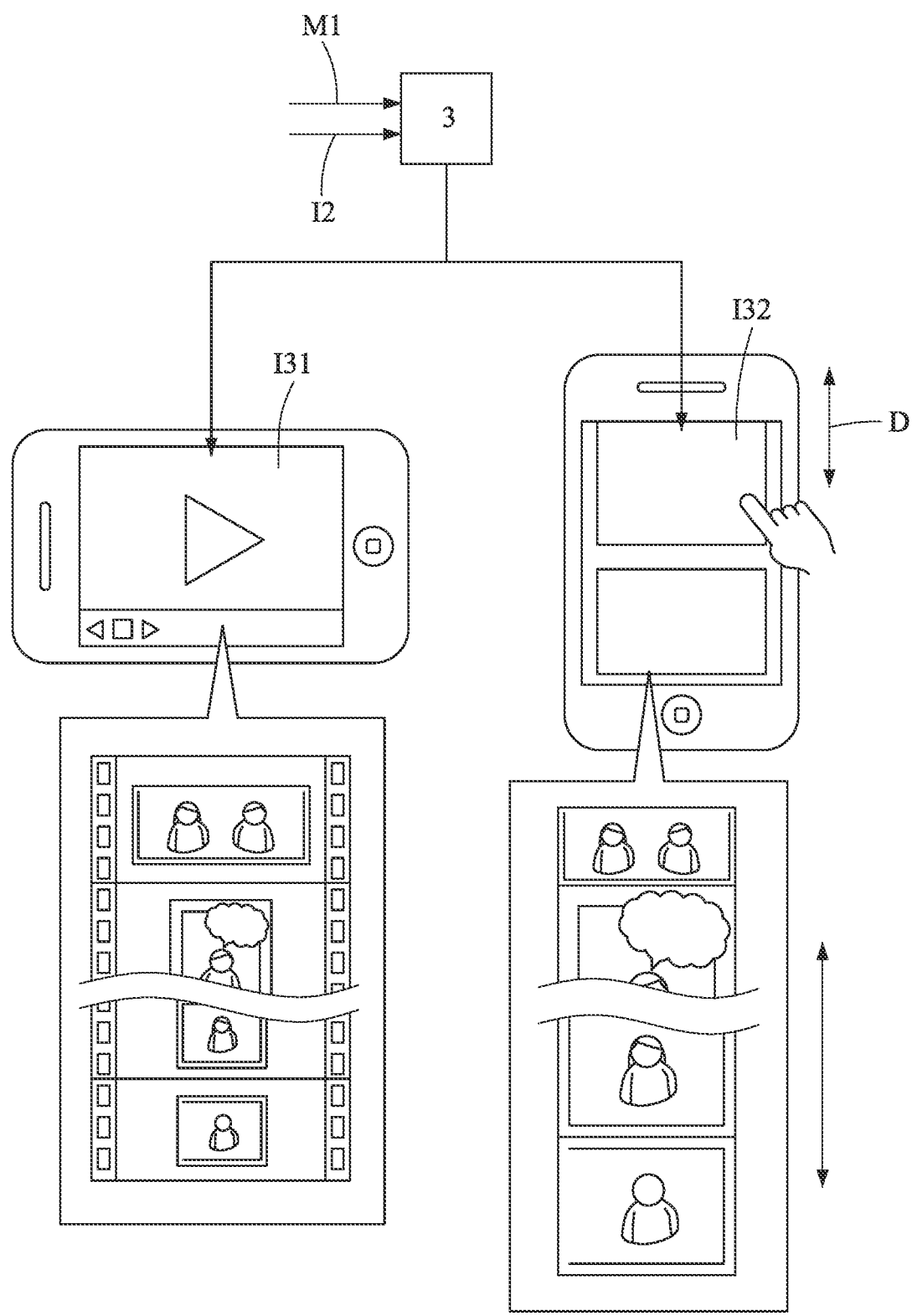
FIG. 4 is a schematic diagram illustrating a frame reassembly step of the image display format conversion method according to the embodiment of the present invention.

As shown in FIG. 4, in the frame reassembly step S3, an image processing unit 3 is utilized to reassemble and convert, based on the frame viewing sequence I2, the plurality of comic frame images M1 into a digital media I31 in an animation-like format or a digital media I32 in a scrolling-comic format, wherein the digital media I31 in the animation-like format is formed by arranging the plurality of comic frame images M1 in an animation according to an animation frame display sequence corresponding to the frame viewing sequence I2, the digital media I32 in the scrolling-comic format is formed by arranging the plurality of comic frame images M1 in a display page in the frame viewing sequence I2 along a predetermined page scrolling direction D.

Specifically, in this embodiment, the digital media I31 in the animation-like format is a video file, such as "mp4" or "mkv" file format, and a user can only play the video file on the smart phone to read the comic without any other subsequent manual operation. However, the present invention is not limited to this, and the digital media I31 in the animation-like format may also be an animated image file, such as "gif" file format that displays the images in sequence as an animation. On the other hand, in this embodiment, the digital media I32 in the scrolling-comic format is formed by embedding the plurality of comic frame images M1 in the same web page, so that the user can easily read the comic frame images M1 in order by scrolling the web page in the predetermined page scrolling direction D. However, the present invention is not limited to this, and the digital media I32 in the scrolling-comic format may be a single image page composed of the plurality of comic frame images M1. In addition, in this embodiment, the predetermined page scrolling direction D is a vertical direction, but the present invention is not limited to this, and the predetermined page scrolling direction D may be a horizontal direction.

Figure 5:
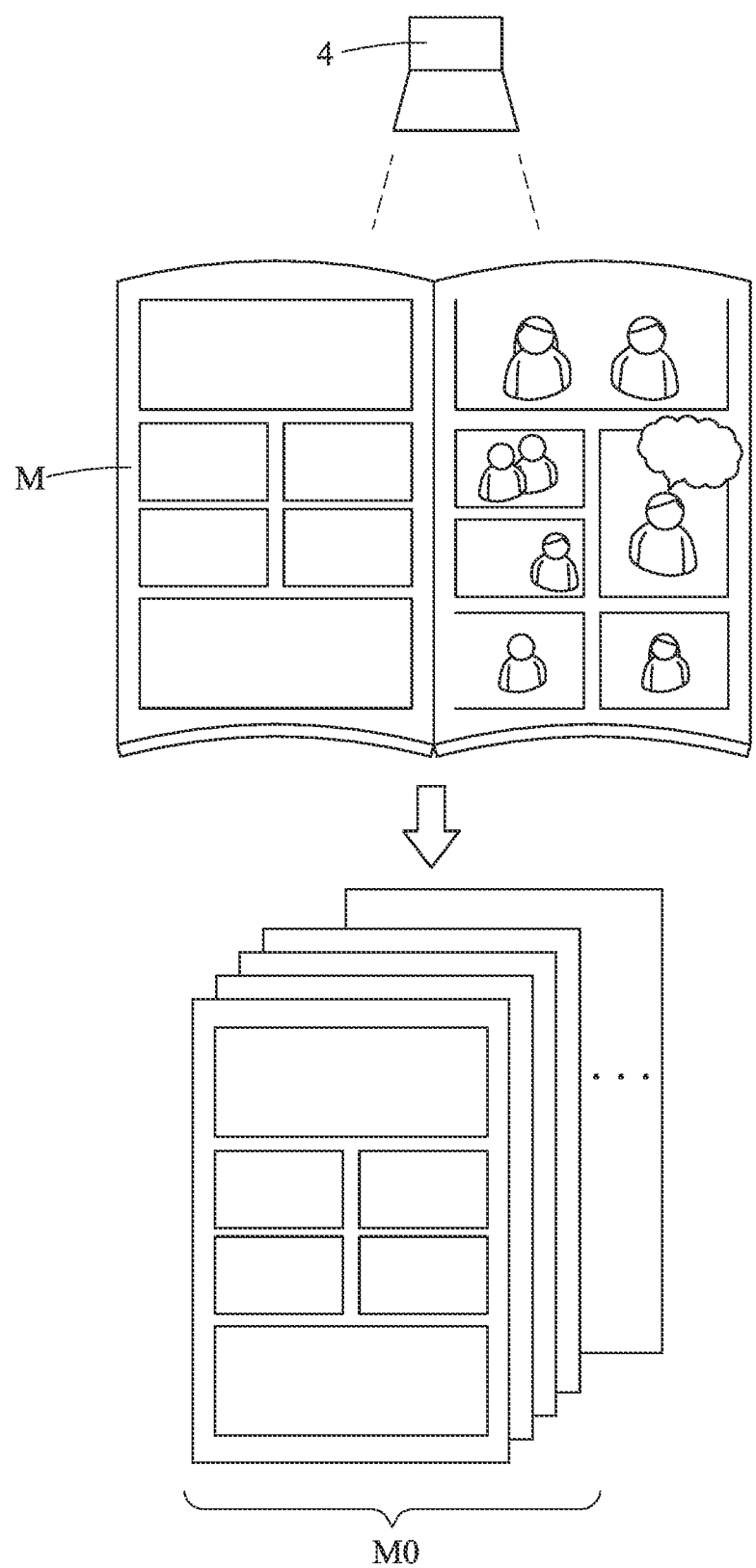
FIG. 5 is a schematic diagram illustrating an image capture step of the image display format conversion method according to the embodiment of the present invention.

As shown in FIG. 1 and FIG. 5, in one embodiment of the present invention, the image display format conversion method further comprises, before the frame recognition step S1, an image capture step S4 of obtaining the comic page image M0 by scanning a paper comic M with a scanning unit 4. The scanning unit 4 may be an image scanner, a camera, or other scanning unit capable of capturing to generate images. Needless to say that the image capture step S4 can be omitted in the case that the comic from which the comic page image M0 is to be obtained is a digital comic from the first rather than a paper comic.

Figure 6:
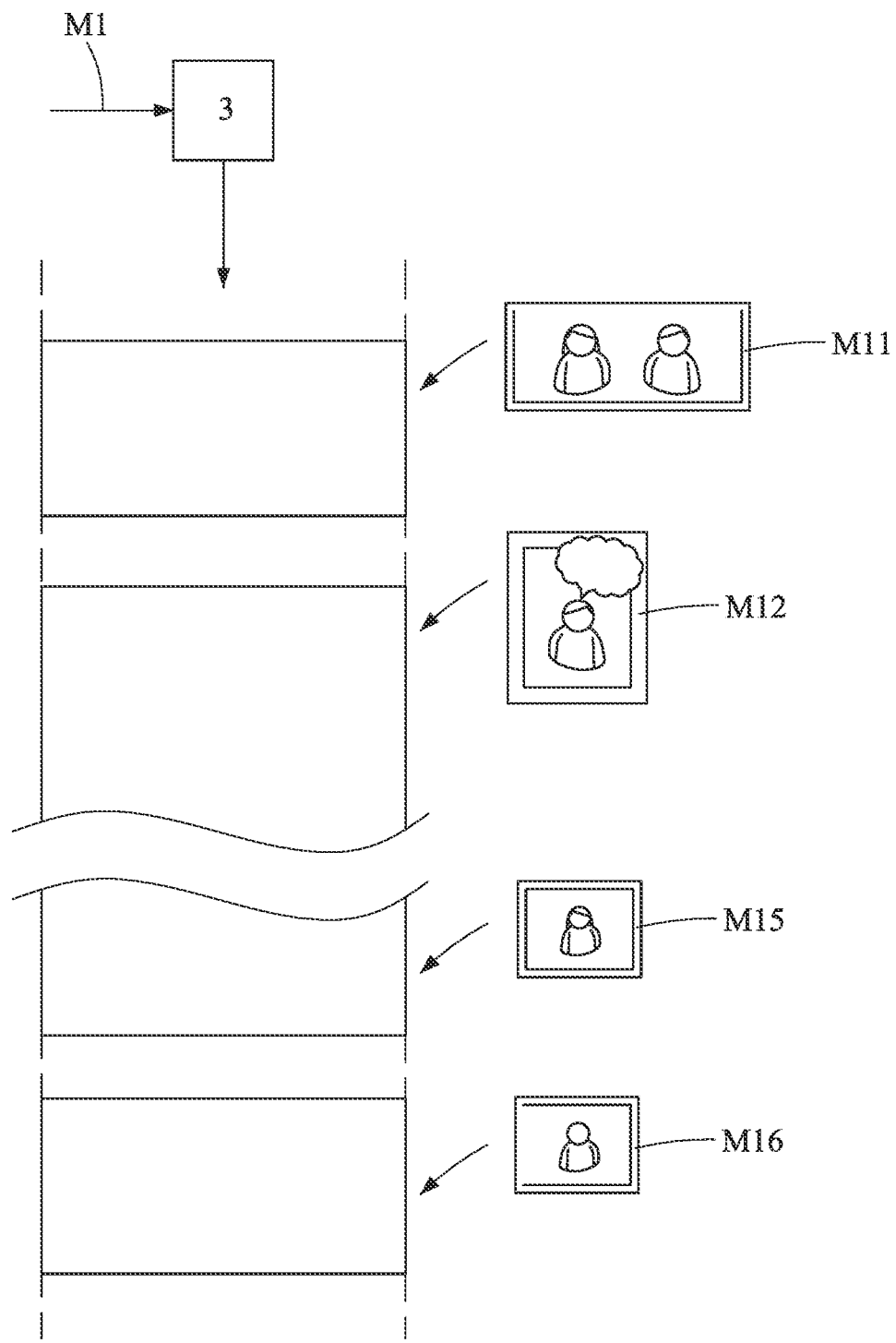
FIG. 6 is a schematic diagram illustrating a frame resizing step of the image display format conversion method according to the embodiment of the present invention.

As shown in FIG. 1 and FIG. 6, in one embodiment of the present invention, the image display format conversion method further comprises, before the frame reassembly step S3, a frame resizing step S5 of utilizing the image processing unit 3 to resize each of the comic frame images M1 to a size within a predetermined display size range. Preferably, in the frame resizing step S5, the plurality of comic frame images M1 is resized to have equal width and/or equal height. In this embodiment, the plurality of comic frame images M1 is resized to have equal width to facilitate reading when the predetermined page scrolling direction D is the vertical direction. When the predetermined page scrolling direction D is the horizontal direction, it is preferred to resize the plurality of comic frame images M1 to have equal height. In the case of the digital media I31 in the animation-like format, it is preferred to resize the plurality of comic frame images M1 to have equal width and equal height in a manner of "stretch to window" or "touch window from inside".

With the technical means mentioned above, the image display format conversion method of the present invention can converse the digital comic into the digital media I31 in the animation-like format or the digital media I32 in the scrolling-comic format so that a reader no longer needs to frequently operate the smart phone screen with gestures when reading the digital comic, and thus the enjoyment of reading the digital comics will not be reduced. Moreover, by converting the digital comic into the digital media I32 in the scrolling-comic format, the reader can simply scroll the screen in one direction to read the comic frames in order without repeatedly loading display pages, and by converting the digital comic into the digital media I31 in the animation-like format, the readers can save most of the effort of operating their smart phones, thus increasing the smoothness of reading and enhancing the reading experience.

The above description should be considered as only the discussion of the preferred embodiments of the present invention. However, a person having ordinary skill in the art may make various modifications without deviating from the present invention. Those modifications still fall within the scope of the present invention.

What is claimed is:

1. An image display format conversion method, comprising in sequence:
a frame recognition step of utilizing a trained deep-learning artificial intelligence frame recognition unit to perform a frame recognition process on a comic page image, which is formed by a plurality of comic frames, to obtain a plurality of comic frame images within the comic page image and frame position information corresponding to the respective comic frame images;
a frame sequence determination step of utilizing an image analysis unit to determine a frame viewing sequence of the plurality of comic frame images according to a selected regional layout rule based on the frame position information of the plurality of comic frame images within the comic page image, wherein the selected regional layout rule is one selected from a plurality of regional layout rules relating to different geographical regions; and
a frame reassembly step of utilizing an image processing unit to reassemble and convert, based on the frame viewing sequence, the plurality of comic frame images into a digital media in an animation-like format or a scrolling-comic format, wherein the digital media in the animation-like format is formed by arranging the plurality of comic frame images in an animation according to an animation frame display sequence corresponding to the frame viewing sequence, the digital media in the scrolling-comic format is formed by arranging the plurality of comic frame images in a display page in the frame viewing sequence along a predetermined page scrolling direction.

2. The image display format conversion method as claimed in claim 1, further comprising, before the frame recognition step, an image capture step of obtaining the comic page image by scanning a paper comic with a scanning unit.

3. The image display format conversion method as claimed in claim 1, wherein in the frame recognition step, the trained deep-learning artificial intelligence frame recognition unit performs the frame recognition process by using a YOLO-based neural network object detection model.

4. The image display format conversion method as claimed in claim 1, wherein in the frame recognition step, each of the comic frame images is a standard frame image, a broken frame image, or an out-of-frame frame image, wherein the standard frame image is the comic frame image having a complete and unbroken frame border, the broken frame image is the comic frame image having the frame border broken on at least one side thereof, and the out-of-frame frame image is the comic frame image having at least a graphical part thereof outside of the frame border.

5. The image display format conversion method as claimed in claim 1, wherein in the frame recognition step, the frame position information is coordinate information about four corners of the comic frame image.

6. The image display format conversion method as claimed in claim 1, wherein in the frame sequence determination step, the plurality of regional layout rules includes a European-American comic layout rule relating to European and American regions and a Japanese comic layout rule relating to Japanese region.

7. The image display format conversion method as claimed in claim 1, further comprising, before the frame reassembly step, a frame resizing step of utilizing the image processing unit to resize each of the comic frame images to a size within a predetermined display size range.

8. The image display format conversion method as claimed in claim 7, wherein in the frame resizing step, the plurality of comic frame images is resized to have equal width and/or equal height.

9. The image display format conversion method as claimed in claim 1, wherein in the frame reassembly step, the predetermined page scrolling direction is a vertical direction or a horizontal direction.

\* \* \* \* \*